US008786721B2

(12) United States Patent
Onodera et al.

(10) Patent No.: US 8,786,721 B2
(45) Date of Patent: Jul. 22, 2014

(54) IMAGE CAPTURING DEVICE

(75) Inventors: Yutaka Onodera, Fussa (JP); Shinichi Matsui, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 398 days.

(21) Appl. No.: 12/343,885

(22) Filed: Dec. 24, 2008

(65) Prior Publication Data

US 2009/0167889 A1    Jul. 2, 2009

(30) Foreign Application Priority Data

Dec. 28, 2007 (JP) ................................. 2007-338556

(51) Int. Cl.
    *H04N 5/228* (2006.01)
(52) U.S. Cl.
    USPC .................... 348/222.1; 348/345; 348/346
(58) Field of Classification Search
    USPC ........................ 348/222.1, 345, 346
    See application file for complete search history.

(56) References Cited

U.S. PATENT DOCUMENTS 4,786,987 A    11/1988  Fujimura et al.
5,732,146 A *  3/1998   Yamada et al. ............... 382/107

(Continued)

FOREIGN PATENT DOCUMENTS

| CN | 1865947 A | 11/2006 |
| CN | 101047858 A | 10/2007 |
| JP | 04-180477 A | 6/1992 |
| JP | 2005-333420 A | 12/2005 |
| JP | 2006-174105 A | 6/2006 |
| JP | 2007-189384 A | 7/2007 |
| JP | 2007-215064 A | 8/2007 |

OTHER PUBLICATIONS

Chinese Office Action dated Dec. 21, 2010 (and English translation thereof) in counterpart Chinese Application No. 200810107497.1.

(Continued)

*Primary Examiner* — Antoinette Spinks
(74) *Attorney, Agent, or Firm* — Holtz Holtz Goodman & Chick PC

(57) ABSTRACT

A control unit monitors a state of captured image sequentially outputted by an image capturing unit. The control unit carries out a first determination that determines whether or not the state of a captured image satisfies a prescribed condition. When the result is that the prescribed condition is satisfied, the captured image is recorded in a recording unit. The control unit also carries out a second determination that determines whether or not the state of the captured image is appropriate for being subjected to the first determination. When the result is that the state is not appropriate for being subjected to the first determination, a warning is issued to the user to this effect.

10 Claims, 8 Drawing Sheets

(56) References Cited

U.S. PATENT DOCUMENTS

| | | | |
|---|---|---|---|
| 7,668,392 B2 | 2/2010 | Yamada et al. | |
| 2002/0136297 A1* | 9/2002 | Shimada et al. | 375/240.04 |
| 2004/0170397 A1 | 9/2004 | Ono | |
| 2004/0235531 A1* | 11/2004 | Anzawa et al. | 455/563 |
| 2005/0018767 A1* | 1/2005 | Lee | 375/240.1 |
| 2006/0171699 A1 | 8/2006 | Nakai et al. | |
| 2007/0098353 A1* | 5/2007 | Chen et al. | 386/46 |
| 2007/0140678 A1 | 6/2007 | Yost et al. | |
| 2007/0223835 A1* | 9/2007 | Yamada et al. | 382/268 |
| 2008/0106647 A1* | 5/2008 | Kimura et al. | 348/607 |
| 2008/0131021 A1* | 6/2008 | Fukuda | 382/274 |
| 2008/0192129 A1* | 8/2008 | Walker et al. | 348/231.2 |
| 2010/0165129 A1* | 7/2010 | Kondo et al. | 348/208.4 |

OTHER PUBLICATIONS

Japanese Office Action dated Feb. 2, 2010 and English translation thereof issued in counterpart Japanese Application No, 2007-338556.

Japanese Office Action dated May 25, 2010 and English translation thereof, issued in counterpart Japanese Application No. 2007-338556.

Chinese Office Action dated Aug. 11, 2010 and English translation thereof, issued in counterpart Chinese Application No. 200810107497.1.

Partial European Search Report (PESR) dated Apr. 4, 2012 (in English) in counterpart European Application No. 08022425.6.

* cited by examiner

IMAGE CAPTURING DEVICE

BACKGROUND OF THE INVENTION

1. Field of the Invention

The present invention relates to an image capturing device.

2. Description of the Related Art

In the related art, various technology has been proposed relating to image capturing devices such as digital cameras equipped with an automatic image capturing (auto shutter) function.

For example, in Unexamined Japanese Patent Application KOKAI Publication No. 2006-174105, it is detected as to whether a subject has entered a specific area (auto shutter area) within the field of view of a camera, with automatic image capture then being carried out upon the timing of entry.

The case is now considered where a photographing environment changes for some reason (for example, such as when brightness of the whole of an image fluctuates substantially as a result of flickering etc. occurring when photographing within a room) when in standby for automatic image capture.

In this kind of situation, when pixel values within the auto shutter area change due to changes in the photographing environment in the method of the related art, this may be erroneously recognized as movement of the subject, with automatic image capturing then being carried out.

In order to resolve the problems of the related art, it is therefore the object of the present invention to provide an image capturing device capable of preventing a situation where automatic image capture is carried out erroneously before such a situation arises.

SUMMARY OF THE INVENTION

In order to achieve the above object, an image capturing device of a first aspect of the present invention comprises:

an image capturing unit that captures an image of a subject and outputs the captured image;

a monitoring unit that monitors a state of the captured images consecutively outputted by the image capturing unit;

a first determining unit that determines whether or not the state of the captured image monitored by the monitoring unit satisfies a prescribed condition;

a recording control unit that records the captured image to a recording unit when the first determining unit determines that the prescribed condition is satisfied;

a second determining unit that determines whether or not a state of the captured image monitored by the monitoring unit is a state where a determination can be carried out appropriately by the first determining unit; and a warning unit that provides a warning indication when it is determined by the second determining unit that a state exists where determination by the first determining unit cannot be carried out appropriately.

It is also possible to further provide a partial region specifying unit that specifies a partial region occurring within a captured image outputted by the image capturing unit, the monitoring unit comprising:

a unit that monitors the state of an image portion corresponding to a partial region specified by the partial region specifying unit, wherein the first determining unit comprises a unit that determines whether or not a state of the image portion monitored by the monitoring unit satisfies a prescribed condition.

In this event, the partial region specifying unit may comprise a unit that specifies a partial region at an arbitrary position within a captured image outputted by the image capturing unit.

Separately from or in addition to the above, the partial region specifying unit may also comprise a unit that specifies a partial region of an arbitrary size within a captured image outputted by the image capturing unit.

It is also possible to further provide an inhibiting unit that inhibits process execution at the monitoring unit or the recording control unit when it is determined by the second determining unit that a state exists where determination by the first determining unit cannot be carried out appropriately.

The monitoring unit may comprise a unit that monitors an amount of change of the captured image sequentially outputted by the image capturing unit, the first determining unit may comprise a unit that determines whether or not the amount of change of captured image monitored by the monitoring unit exceeds a predetermined threshold value, and the recording control unit may comprise a unit that records the captured image to the recording unit when the first determining unit determines that the amount of change of the captured image exceeds the threshold value.

In this event, the second determining unit may comprise a unit that determines whether or not the amount of change of captured images monitored by the monitoring unit exceeds a prescribed amount, and the warning unit may comprise a unit that issues a warning when the second determining unit determines that the amount of change for the captured images exceeds the prescribed amount.

A threshold value setting unit that sets a threshold value according to the amount of change of the captured image monitored by the monitoring unit may also be provided.

The first determining unit may comprise a unit that determines whether or not the amount of change for the captured image monitored by the monitoring unit exceeds the threshold value set by the threshold value setting unit.

The monitoring unit may also comprise a pixel difference value acquiring unit that acquires a pixel difference value that is based on difference values between a plurality of pixels constituting the captured image outputted by the image capturing unit.

Here, a pixel difference value for one captured image of the plurality of captured images outputted by the image capturing unit is taken as a reference value, differences between the reference value and the pixel difference value for each of other captured images are calculated so as to acquire an evaluation value in order to observe the amount of change of the captured images outputted consecutively by the image capturing unit.

In this event, the threshold value setting unit may set a threshold value according to a largest evaluation value of the plurality of evaluation values acquired by the monitoring unit.

Moreover, an image capturing device of a second aspect of the present invention comprises:

an image capturing unit that captures an image of a subject and outputs the captured images;

a monitoring unit that monitors an amount of change of the captured image consecutively outputted by the image capturing unit;

a threshold value setting unit that sets a threshold value according to the amount of change of the captured image monitored by the monitoring unit;

a determining unit that determines whether or not the amount of change for captured image monitored by the monitoring unit exceeds the threshold value set by the threshold value setting unit; and a recording control unit that records the captured image to a recording unit when the determining unit determines that the amount of change exceeds the threshold value.

Moreover, an image capturing device of a third aspect of the present invention comprises:

an image capturing unit that captures an image of a subject and outputs the captured images;

a pixel difference value acquiring unit that acquires pixel difference value that is based on difference values between a plurality of pixels constituting the captured image outputted by the image capturing unit;

an evaluation value acquiring unit that takes a pixel difference value for one captured image of the plurality of captured images outputted by the image capturing unit as a reference value, and calculates differences between the reference value and the pixel difference value for each of other captured images so as to acquire an evaluation value;

a determining unit that determines whether or not the evaluation value acquired by the evaluation value acquiring unit exceeds a threshold value; and a recording control unit that records the captured image to a recording unit when the determining unit determines that the evaluation value exceeds the threshold value.

DETAILED DESCRIPTION OF THE PREFERRED EMBODIMENTS

The following embodiment gives an explanation of applying the image capturing device of the present invention to a digital camera.

Figure 1A:
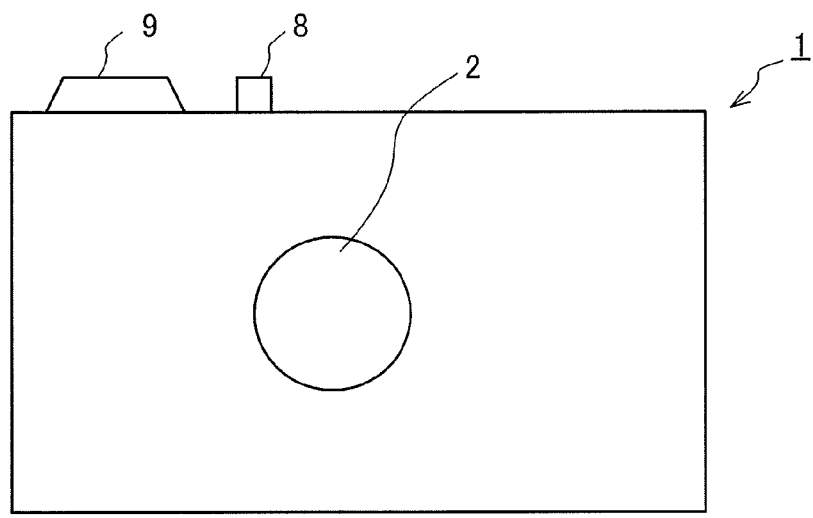
FIGS. 1A to 1C are views showing the appearance of a digital camera taken as an image capturing device of an embodiment of the present invention.
Figure 1B:
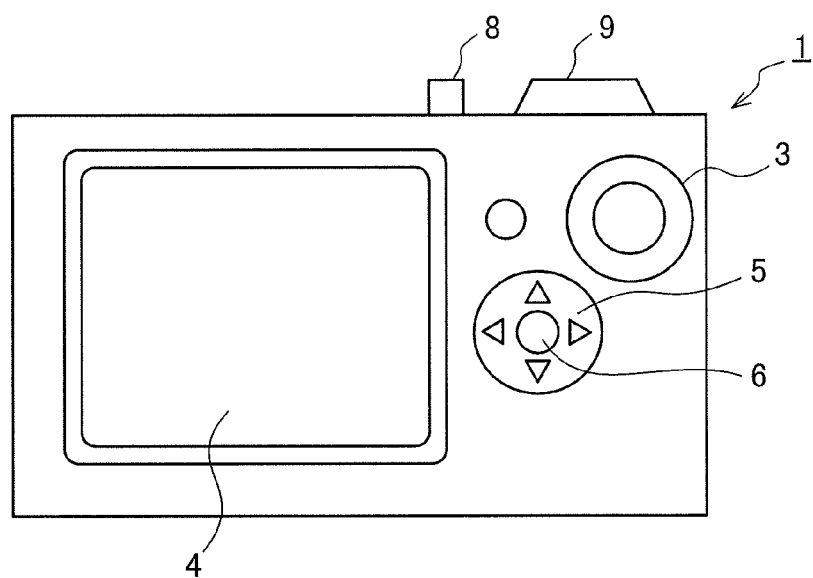
Figure 1C:
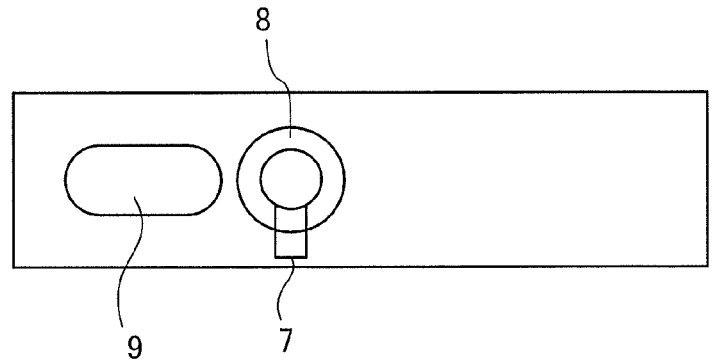

FIGS. 1A and 1B are views showing the appearance of a digital camera 1 of this embodiment, where FIG. 1A is a front view, FIG. 1B is a back view, and FIG. 1C is a plan view.

As shown in FIG. 1A, the digital camera 1 has an image capturing lens 2 at a front surface. As shown in FIG. 1B, a mode dial 3, a liquid crystal monitor screen 4, a cursor key 5, and a SET key 6 etc. are provided at the back surface of the digital camera 1. A zoom lever 7, a shutter key 8 that is pressable in two stages that is capable of both being pressed half way down and being pressed all the way down, and a power supply button 9 are provided at the upper surface, as shown in FIG. 1C.

A USB terminal for connecting with external devices such as personal computers and modems is provided at a side section (not shown).

Figure 2:
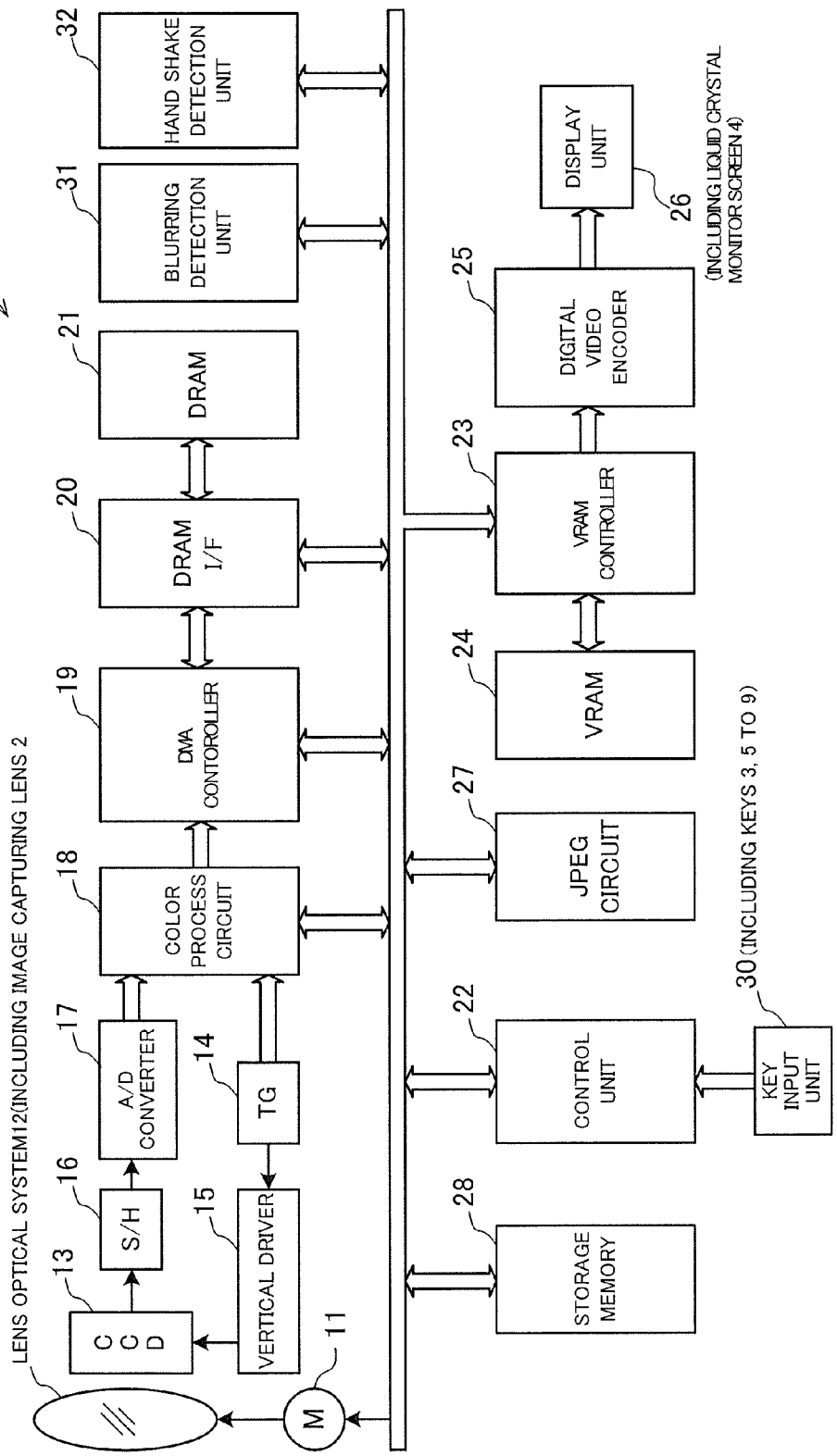
FIG. 2 is a block diagram showing an internal configuration for the digital camera shown in FIGS. 1A to 1C.

FIG. 2 is a block diagram showing an internal configuration for the digital camera 1. The digital camera 1 shown in FIG. 2 includes a motor (M) 11 for moving to a focusing position or aperture position in image capture mode, a lens optical system 12 constituting the image capturing lens 2, a CCD (Charge Coupled Device) 13 that is an image capturing element, a timing generator (TG) 14, a vertical driver 15, a sample/hold circuit (S/H) 16, an analog/digital (A/D) converter 17, a color process circuit 18, a DMA (Direct Memory Access) controller 19, a DRAM interface (I/F) 20, a DRAM 21, a control unit 22, a VRAM controller 23, a VRAM 24, a digital video encoder 25, a display unit 26, a JPEG (Joint Photograph Coding Experts Group) circuit 27, a storage memory 28, a key input unit 30, a blurring detection unit 31, and a hand shake detection unit 32.

The motor 11, the lens optical system 12, CCD 13, TG 14, the vertical driver 15, the S/H 16, the A/D converter 17, and the color process circuit 18 constitute an image capturing unit of the present invention.

It is also possible to adopt a configuration that is not provided with the hand shake detecting unit 32.

In a monitoring state in image capture mode, a focal position or aperture position is moved to as a result of driving of the motor 11 and the CCD 13 disposed to the rear of an image capturing light axis of the lens optical system 12 is driven so as to be scanned by the TG 14 and the vertical driver 15. An optical image obtained by the lens optical system 12 is then formed at the CCD 13. The CCD 13 outputs one screen portion of color image data (Bayer data) corresponding to the formed optical image every fixed period.

The CCD 13 is a solid-state image capturing device that captures two-dimensional images of a subject that typically takes images for a few tens of frames every second. A Bayer array color filter is provided on the CCD 13. It is also possible to adopt solid-state image capturing devices other than CCD's such as, for example, CMOS (Complementary Metal Oxide Semiconductor) devices as image capturing elements.

Bayer data outputted from the CCD 13 is subjected to appropriate gain adjustment for each of the color components of RGB as an analog signal. The Bayer data is then subjected to sampling and holding at the S/H 16 and is outputted to the color process circuit 18 after being converted to digital data at the A/D converter 17.

The color process circuit 18 subjects the digitized Bayer data to color process processing including image interpolation processing, gamma correction processing, and luminance/chrominance signal conversion processing so as to generate a digital luminance signal Y and chrominance signals Cb, Cr. The signals are then the outputted to the DMA controller 19 in image capturing mode. The color process circuit 18 has a function for outputting Bayer data converted to digital data by the A/D converter 17 to the control unit 22.

In image capturing mode, the DMA controller 19 DMA transfers the luminance signal Y and the chrominance signals Cb, Cr outputted by the color process circuit 18 to the DRAM 21 used as a buffer memory via the DRAM I/F 20. During this time, a composite synchronous signal, a memory write-enable signal, and a clock signal from the color process circuit 18 are used.

The control unit 22 controls the overall operation of the digital camera 1. The control unit 22 includes a CPU or MPU, a program storage memory such as a flash memory that statically stores various control programs including auto shutter processing during image capturing mode and various data used during execution of these control programs, and RAM etc. (none of which are shown) used as work memory.

The control unit 22 reads out the luminance and chrominance signals DMA-transferred to the DRAM 21 from the DRAM 21 via the DRAM I/F 20 and writes the signals to the VRAM 24 via the VRAM controller 23.

The control unit 22 extracts control programs and menu data corresponding to each mode stored in the program storage memory in response to a user operation signal from the key input unit 30. The control unit 22 carries out control of execution of other functions (for example, playback functions etc.) the digital camera 1 is provided with and controls displaying of function selection menus when selecting functions.

The digital video encoder 25 periodically reads out the luminance and chrominance signals from the VRAM 24 via the VRAM controller 23 and generates video signals for output to the display unit 26 based on this data.

The display unit 26 functions as a monitor display unit (electronic finder) during image capturing mode and displays captured images in real-time (so-called "through image display").

While executing automatic image capture (auto shutter), the control unit 22 performs a DMA transfer to the DRAM 21 of the luminance and chrominance signals for one screen portion read in from the CCD 13 at this time. After this transfer is complete, a path from the CCD 13 to the DRAM 21 is immediately blocked and a transition is made to a recording/saving state.

In this recording/saving state, the control unit 22 reads out the luminance and chrominance signals for one frame portion returned to the DRAM 21 via the DRAM I/F 20 in units referred to as basic blocks of eight vertical pixels×eight horizontal pixels for each component of Y, Cb and Cr for output to the JPEG circuit 27. The JPEG circuit 27 subjects data from the control unit 22 to data compression using processing such as ADCT (Adaptive Discrete Cosine Transformation), or Huffman encoding that is an entropy encoding method.

The control unit 22 records compressed data (encoded data) acquired from the JPEG circuit 27 to the storage memory 28 as a data file for one image. The control unit 22 then reactivates the path from the CCD 13 to the DRAM 21 in accompaniment with the completion of the processing for compressing the luminance and chrominance signals for one frame portion and the completion of writing of the compressed data to the storage memory 28.

Further, the control unit 22 selectively reads out image data (compressed data) recorded in the storage memory 28 during playback mode. The read out image data is then expanded using the reverse procedure to the procedure for compression processing described above at the JPEG circuit 27. The control unit 22 then stores the expanded image data to the VRAM 24 via the VRAM controller 23, periodically reads out image data from the VRAM 24, generates a video signal, and provides a playback output to the display unit 26.

The key input unit 30 includes the mode dial 3, the cursor key 5, the SET key 6, the zoom lever 7, the shutter key 8, and the power supply button 9. Signals accompanying these key operations (user operation signals) are then sent to the control unit 22.

The mode dial 3 is a dial key operated during selection of each of the various modes. Selection of the mode can also be carried out using a menu selection.

The cursor key 5 is a key that is operated during pointing (designation) using a cursor at a menu item or icon etc. displayed at the liquid crystal monitor screen 4. The cursor can be moved up and down, or to the left and right, using the cursor key 5.

The SET key 6 is a key that is pressed down at times such as when the results of operation of the cursor key 5 are confirmed. Although the details are explained later, one example is that it is possible for the user (photographer) to set a specific area within the field of view of the camera as an auto shutter area by operating the cursor key 5 and the SET key 6 (refer to FIGS. 7A to 7C). After setting the auto shutter area, at the time of auto shutter mode, when the subject enters within the auto shutter area, automatic image capturing is carried out.

The zoom lever 7 can be used to carry out the zoom operation. The specifications for the zoom can be for a digital zoom or an optical zoom. In the case of a digital zoom, a zoom value is decided in accordance with operation of the zoom lever 7 but the actual image angle taken by the CCD 13 is not changed. An image of a size corresponding to the zoom value that is a trimmed version of the captured image is then displayed in an enlarged manner at the liquid crystal monitor screen 4.

On the other hand, in the case of an optical zoom, the zoom lens (varifocal distance lens) is moved from a wide side to a telefocal side in accordance with the operation of the zoom lever 7. The zoom value is then decided in accordance with the operation of the zoom lever 7 and the image angle is actually changed in accordance with change of the zoom value. Wide images and telefocal images can then be displayed at the liquid crystal monitor screen 4 in accordance with the zoom value.

The blurring detection unit 31 detects images captured in the DRAM 21 during through image display, i.e. the blurring detection unit 31 detects blurring of a subject from image data outputted from the color process circuit 18 and outputs the results of this detection to the control unit 22.

The blurring detection unit 31 can also, for example, be configured from a single chip microcomputer. This microcomputer has a function for acquiring motion vectors (information indicating to what extent each element within an image is moving in which direction) for target regions for comparing an image Gz captured immediately previously in the DRAM 21 and an image Gk captured on this occasion and outputting a difference ΔG (or a digital signal denoting a numeric value corresponding to this difference) to the control unit 22.

Alternatively, in place of the blurring detection unit 31, it is also possible to acquire motion vectors for target regions for comparing images for before and after captured in the DRAM 21, and store a program for calculating the amount of blurring of the subject to program storage memory for execution at the control unit 22. A publicly known method can be used as the method for acquiring information for the motion vectors.

The hand shake detection unit 32 detects shake of the digital camera 1 during image capture, converts the results of this detection to a digital signal and sends a hand shake detection signal to the control unit 22. The hand shake detection unit 32 can be a publicly known small type vibration detection device such as, for example, an angular acceleration sensor (a sensor that detects hand shake in a vertical direction and in a lateral direction) or can be a vibrational gyroscope employing a piezoelectric element etc.

It is also possible to perform alignment of the positions of pixels between frame images acquired (photographed) in a time series according to detection results (amount of shake) of either or both of the blurring detection unit 31 and the hand shake detection unit 32. According to this configuration, it is possible to cancel changes between frame images due to hand shake and it is therefore possible to improve the precision of detection of changes (movement) of the subject described later.

It is also possible to only detect dynamic blurring (=subject blurring) by subtracting the amount of hand shake detected by the hand shake detection unit 32 from the amount of blurring (blurring constituted by hand shake and dynamic blurring) detected by the blurring detection unit 31 when the blurring detection unit 31 and the hand shake detection unit 32 are provided.

Figure 3:
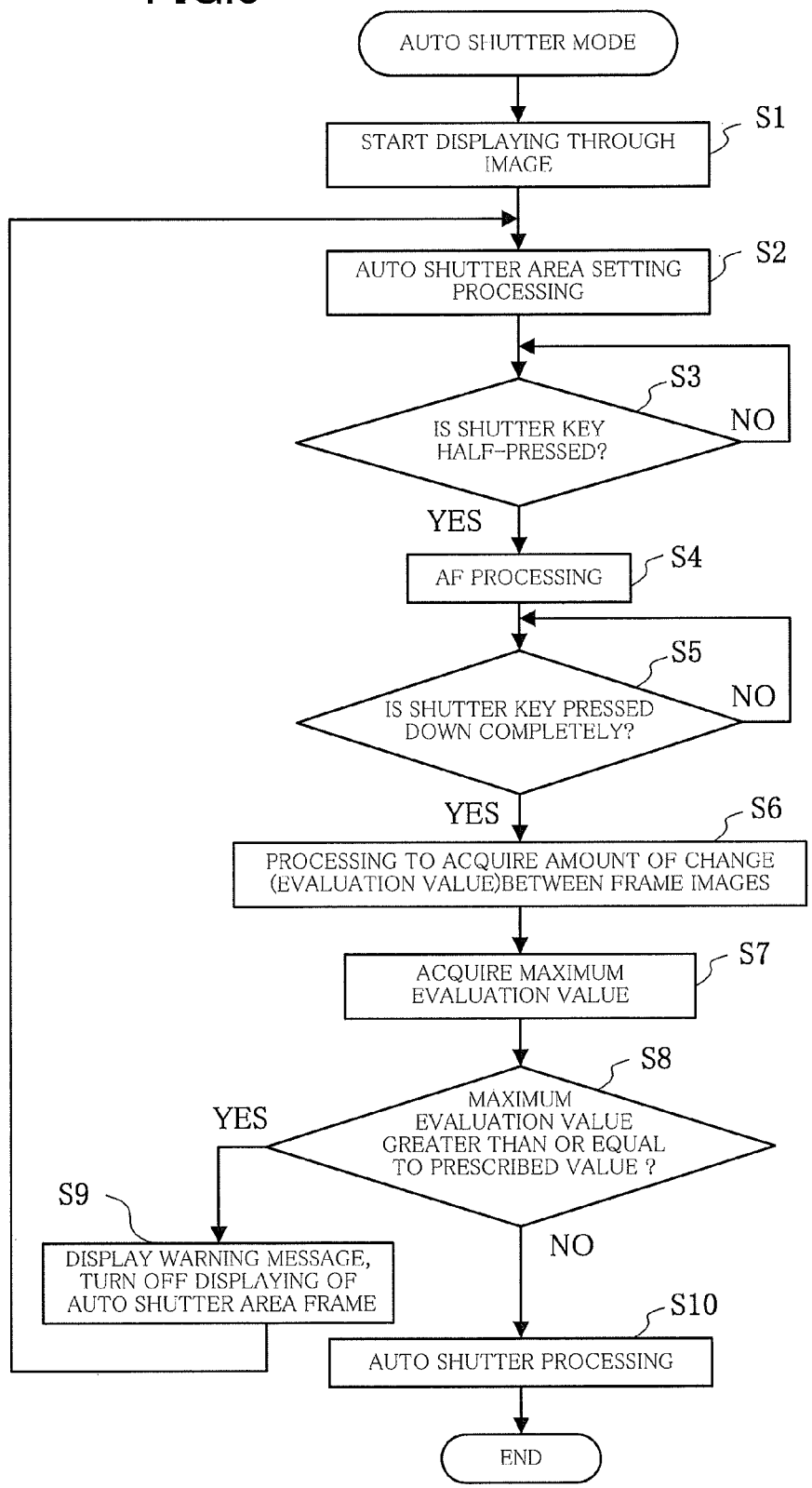
FIG. 3 is a flowchart showing processing content during auto shutter mode.

An explanation is now given of the operation of the digital camera 1 configured as described above of the present invention. FIG. 3 is a flowchart showing the content of processing during auto shutter mode. This auto shutter mode is provided in advance at the digital camera 1 as a lower mode for an image capturing mode and can be set by the user operating the mode dial 3.

When the auto shutter mode is set, the control unit 22 immediately captures a subject image using the CCD 13 and starts to display a through image at the display unit 26 (liquid crystal monitor screen 4) (Step S1). An image capture frame rate for through image displaying is 30 frames/second.

Figure 4:
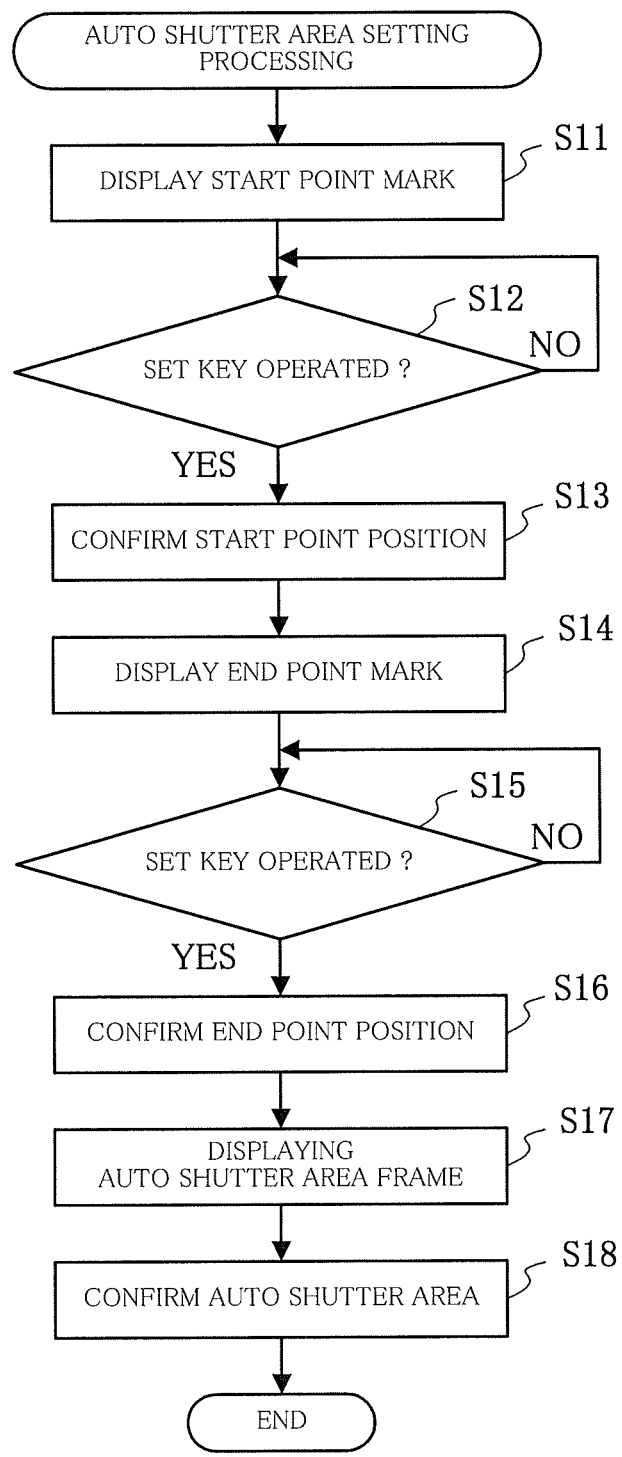
FIG. 4 is a flowchart showing a procedure for auto shutter area setting processing.
Figure 7A:
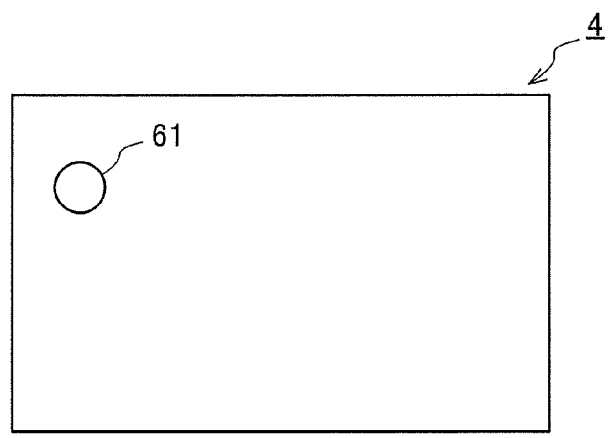
FIGS. 7A to 7C are views illustrating auto shutter area settings.

The control unit 22 then starts auto shutter area setting processing (Step S2). FIG. 4 is a flowchart showing a procedure for auto shutter area setting processing. As shown in FIG. 7A, first, the control unit 22 overlays the through image using an OSD (On-Screen Display) and displays a mark for use in deciding a start point at a prescribed position on the screen (step S11). The user then operates the cursor key 5 so as to move a start point mark 61 shown in FIG. 7A to a desired position and presses the SET key 6. When the SET key 6 is pressed down by the user (YES in step S12), the control unit 22 confirms the current position of the start point mark 61 as a start point position (step S14), and changes the color displayed for the start point mark 61 to a prescribed color (for example, blue).

Figure 7B:
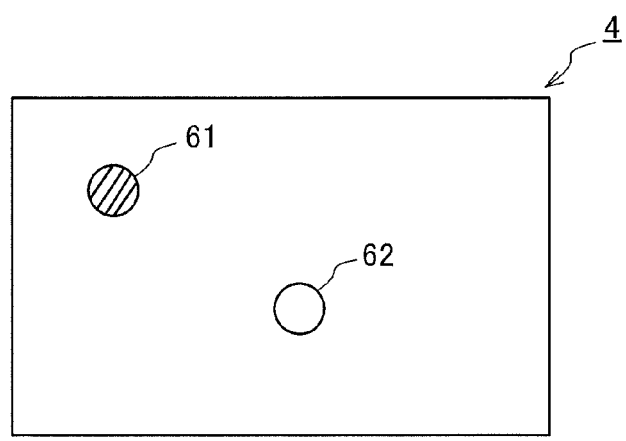

Simultaneously, as shown in FIG. 7B, the control unit 22 displays a map for deciding an end point at a prescribed position on the screen (set based on the position of the decided start point mark 61) (step S14). The user then similarly operates the cursor key 5 so as to move an end point mark 62 shown in FIG. 7B to a desired position and presses the SET key 6. When pressing of the SET key 6 during displaying of the end point mark 62 is detected (step S15, YES), the control unit 22 confirms the current position of the end point mark 62 as an end point position (step S16) and changes the color displayed for the end point mark 62 to a prescribed color (a color different to the color confirmed for the start point mark 61, for example, green etc.).

Figure 7C:
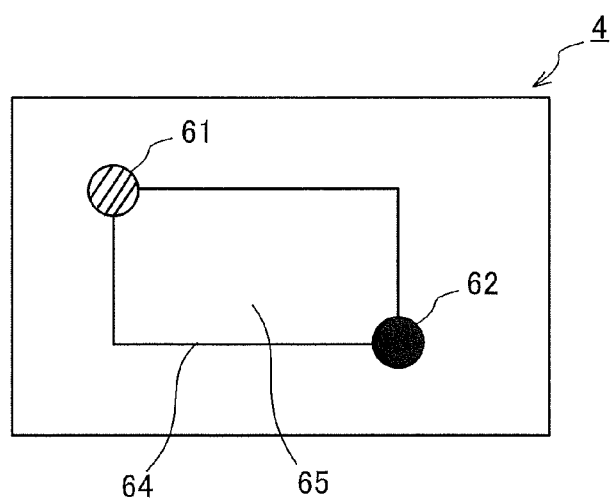

Next, as shown in FIG. 7C, a rectangular frame (auto shutter area frame 64) taking a line segment linking the start point mark 61 and the end point mark 62 as a diagonal is displayed (step S17) and a region within this auto shutter area frame 64 is confirmed (stored in RAM etc.) as an auto shutter area 65 (step S18).

The auto shutter area setting processing is not limited to the above contents. For example, it is also possible to display an auto shutter area frame of a prescribed size at a prescribed position (for example, the center) on the through image immediately, when the auto shutter mode is set by the user. In this event, it is also possible to have the auto shutter area frame mounted vertically and horizontally as a result of the operation of the cursor key 5 by the user, or to change the size of the auto shutter area frame as a result of operation of the zoom lever 7.

The control unit 22 can also confirm the current (currently displayed) region within the auto shutter area frame as the auto shutter area as the result of operation of the SET key 6 thereafter. It is also possible to change the color displayed for the auto shutter area frame to a prescribed color during this time.

Returning to FIG. 3, when the auto shutter area is confirmed, the control unit 22 determines whether or not the shutter key 8 is pressed down halfway (step S3). When it is determined that the shutter key 8 is pressed down halfway (step S3, YES), the control unit 22 executes AF (autofocus) processing (step S4). A well-known contrast detection method is adopted as the AF processing. Specifically, while moving the focus lens within the lens optical system 12, a contrast component (high-frequency component) for an image within the auto shutter area set in step S2 is acquired every time an image (frame image) is captured. The focus lens is then moved to the lens position when the largest contrast component is acquired.

The auto shutter mode of the present invention is a mode for carrying out automatic image capturing when a subject enters within the auto shutter area set by the user. There is therefore not usually a subject within the auto shutter area at the time when the shutter key 8 is pressed down halfway.

It is therefore necessary to carry out AF processing after the user provisionally positions (stands) the subject at a desired position within the auto shutter area. The provisional subject is of course removed after completion of the AF processing.

When the AF processing is complete, the control unit 22 determines whether or not the shutter key 8 is pressed down completely (step S5). When it is determined that the shutter key 8 is pressed down completely (step S5, YES), the control unit 22 executes processing to acquire an amount of change (evaluation value) between frame images (step S6).

Figure 5:
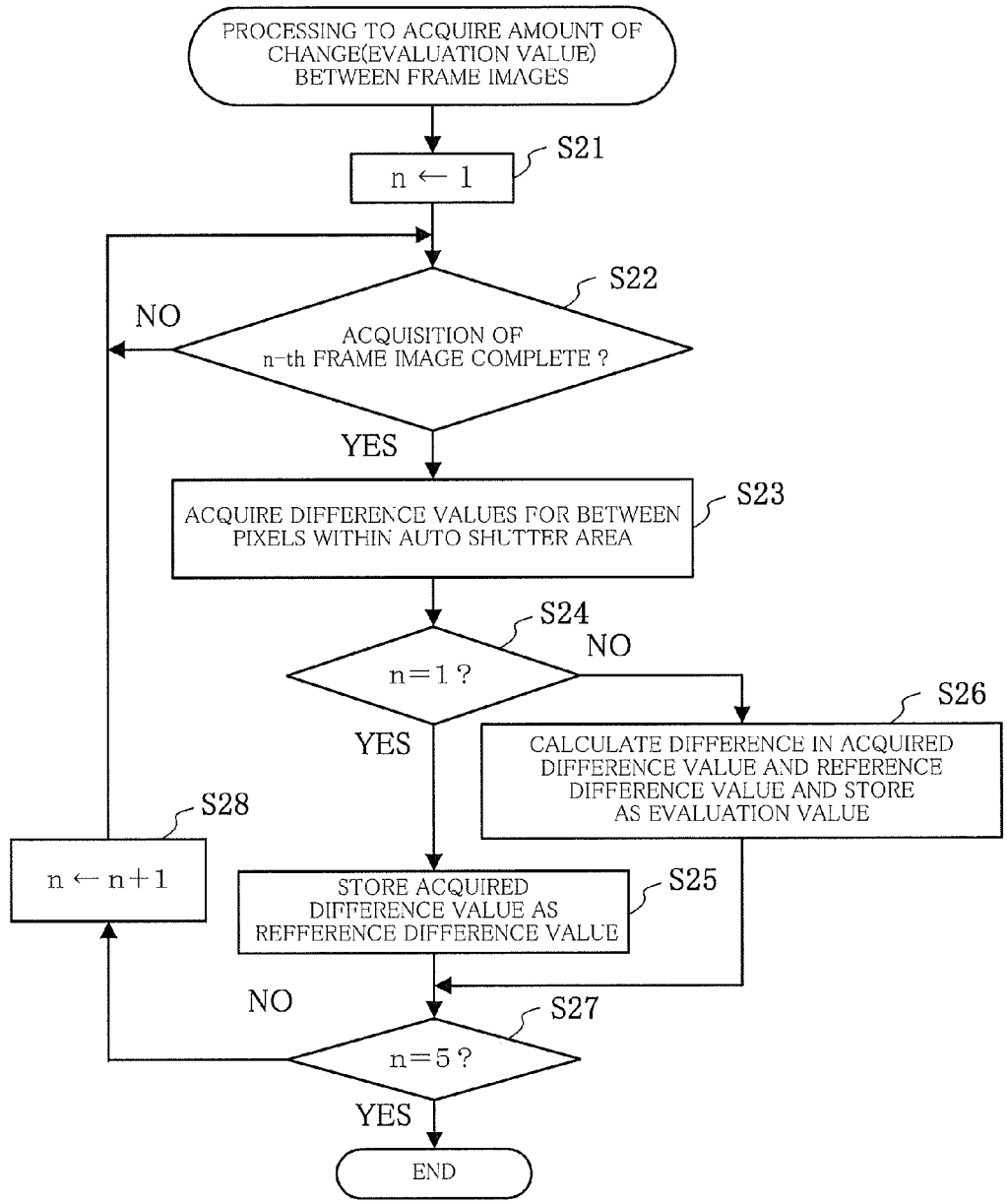
FIG. 5 is a flowchart showing a procedure for processing for acquiring an amount of change (evaluation value) between frame images.

FIG. 5 is a flowchart showing a procedure for processing for acquiring the amount of change (evaluation value) between frame images. First, after setting 1 as a value for a frame number n (step S21), the control unit 22 determines whether or not an n-th frame image has been acquired (image capture complete) (step S22).

When it is determined that an n-th frame image has been acquired (step S22, YES), the control unit 22 acquires a difference value between pixels contained within the auto shutter area (step S23). Specifically, first, the control unit 22 calculates a difference value for values for a neighboring R-pixel and G-pixel, a difference value for values for a neighboring R-pixel and B-pixel, and a difference value for values for a neighboring B-pixel and G-pixel for all of the pixels within the auto shutter area for the Bayer data sent from the color process circuit 18. A single difference value is then acquired by adding or averaging the plurality of calculated difference values.

Other methods are also possible as the method for acquiring difference values between pixels included within the auto shutter area. For example, it is also possible to acquire difference values for average values (or added values) for separate colors after calculating average values (added values) for each color (R, G, B) included within the auto shutter area. It is also possible to acquire difference values between pixels of the same color. It is further possible to acquire difference values between pixels while using only some of the pixels (for example, pixels on the upper left) from within the pixels contained in the auto shutter area. Moreover, it is possible to set (change) target pixels in order to acquire difference values every pixel.

It is also possible to acquire difference values between pixels using data other than Beyer data such as, for example, RGB image data for after pixel interpolation or YUV (luminance/chrominance) image data.

It is typically possible to detect change (movement of the subject) of conditions within the auto shutter area by simply comparing values for pixels within the auto shutter area within each frame image acquired in a time series. However, when a change occurs in the photographing environment (for example, when the luminance of the whole of the image fluctuates substantially etc. as a result of flickering etc. occurring during photographing within a room), conditions within the auto shutter area change substantially. Problems may then occur where it is not possible to accurately detect movement of the subject.

In other words, it is extremely difficult to cancel out the influence of flickering etc. existing between frame images by just simply comparing pixel values.

The present invention therefore suppresses drops in the precision of the detection of movement of the subject by canceling out the influence of flickering etc. by acquiring difference values between pixels for each frame image and comparing the difference values.

When the luminance of each frame image changes substantially as a result of flickering etc., the present invention takes note of the fact that the influence of flickering etc. on each of the pixels is uniform regardless of pixel position for images of the same frame. The present invention therefore acquires different values between pixels that are present in the images for the same frame. It is therefore possible to cancel at the influence of flickering etc. on the pixels while retaining correlation existing between pixels.

Returning to the explanation for the flowchart of FIG. 5, after acquiring difference values for between pixels included within the auto shutter area in step S23, the control unit 22 determines whether or not the frame number n is "1" (step S24). When it is determined that "n=1" (step S24, YES), the control unit 22 stores the acquired difference value to the DRAM 21 as a reference difference value (step S25).

On the other hand, when it is determined that n is not equal to 1 (step S24, NO), the control unit 22 calculates a difference for a difference value for an image of frame number n acquired in step S23 and the reference difference value stored in the DRAM 21. This difference is then stored in the DRAM 21 as the evaluation value (step S26).

After this, the control unit 22 determines whether or not the frame number n is "5" (step S27). When it is determined that n is not equal to 5 (step S27, NO), the control unit 22 increments the frame number n (step S28), returns to step S22, and repeats the processing described above.

On the other hand, when it is determined that "n=5" (step S27, YES), this processing (processing to acquire an amount of change (evaluation value) between the frame images) ends.

Returning to FIG. 3, the control unit 22 then acquires the largest evaluation value (maximum evaluation value) of the four evaluation values stored in the DRAM 21 (step S7).

The control unit 22 then determines whether or not the acquired maximum evaluation value is greater than or equal to a prescribed value decided in advance (step S8). As a result, when the acquired maximum evaluation value is determined to be the prescribed value or more (step S8, YES), the control unit 22 displays a warning message on the through image displayed at the display unit 26 (liquid crystal monitor screen 4) for a fixed period of time, and disappears the auto shutter area frame 64 displayed on the through image (step S9). The processing of step S2 is then executed again.

In this way, when the maximum evaluation value is greater than or equal to the prescribed value decided in advance, the change in the image (pixels) within the auto shutter area is excessively dramatic. This means that it is difficult to correctly detect movement of the subject within the auto shutter area. A warning message is therefore displayed in order to prevent erroneous automatic image capture from being carried out, the user is warned, and auto shutter processing is not proceeded to thereafter.

Figure 6:
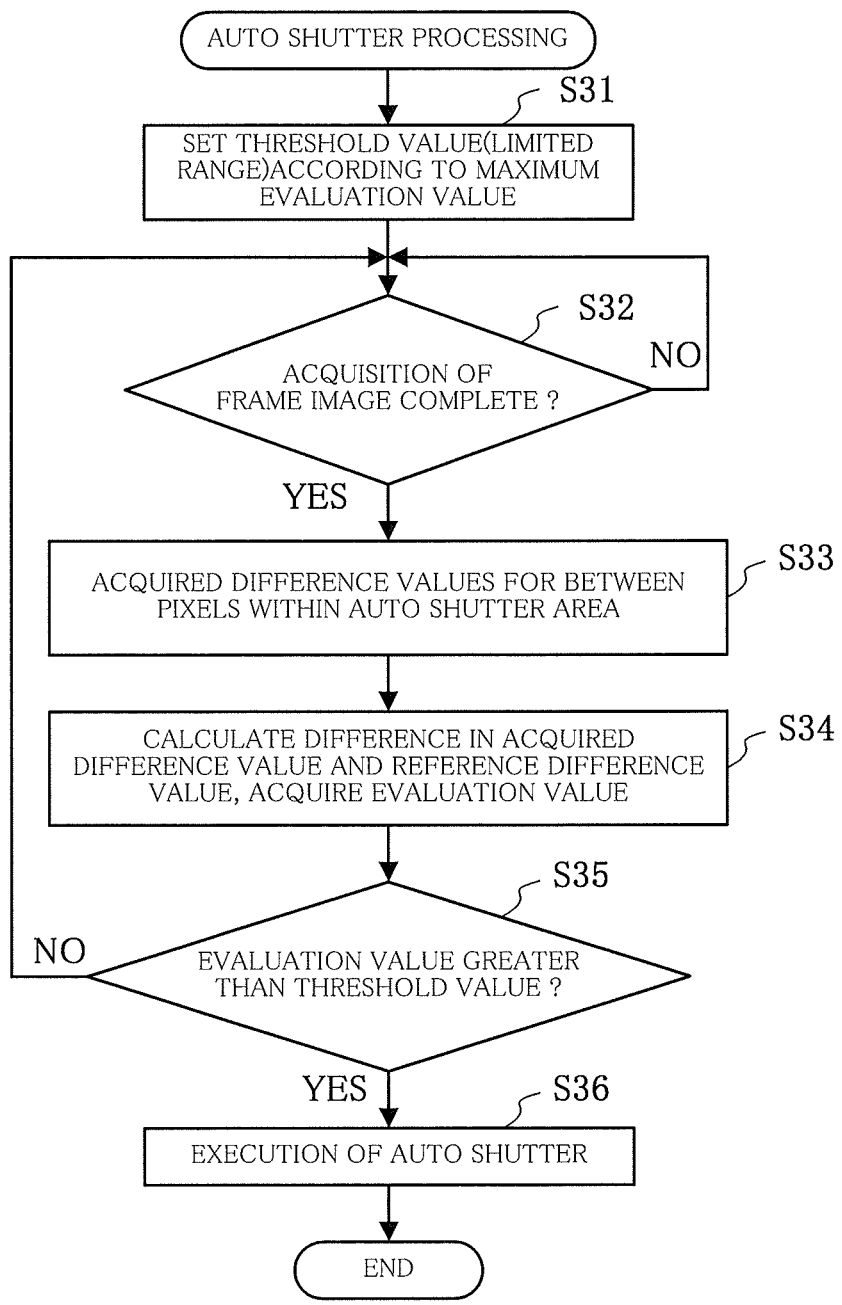
FIG. 6 is a flowchart showing a procedure for auto shutter processing.

In the auto shutter processing described in the following (refer to FIG. 6), a threshold value (permitted range) is set according to the maximum evaluation value (refer to step S31 of FIG. 6). This means that when a restriction is not placed on the maximum evaluation value, there is the possibility that an extremely large value will be set as the threshold value (permitted range). If this happens, the evaluation value can not exceed the threshold value (permitted range) even if a subject enters the auto shutter area. There is therefore the fear that a situation will occur where automatic image capture is not carried out regardless of how long the user waits for. It can therefore be said to be necessary to place a restriction on the maximum evaluation value in order to prevent this situation from occurring.

When the maximum evaluation value is greater than or equal to the prescribed value decided in advance (step S8, YES), after a warning is issued to the user (step S9), step S2 is returned to, and the user is invited to reset the auto shutter area. Depending on the case, it can be considered to be possible that at image portions other than image portions corresponding to the auto shutter area set by the user where the image (pixel) change is dramatic, the change in the image (pixels) is not so dramatic (for example, when an object with an extremely high reflectance such as a mirror is within the auto shutter area).

A message such as "it is not possible to perform automatic image capture correctly in the current photographing environment" or "the auto shutter area settings are inappropriate, please set again" can be considered as the content for the warning message.

When the maximum evaluation value is not greater than or equal to the prescribed value decided in advance (step S8, NO), the auto shutter processing is started (step S10). FIG. 6 is a flowchart showing a procedure for auto shutter processing. First, the control unit 22 sets a threshold value (permitted range) corresponding to the maximum evaluation value. This means that, for example, change in the photographing environment is dramatic when the maximum evaluation value is large and it is therefore necessary to set the threshold value to be large so as not to erroneously recognize the timing of automatic image capture. On the other hand, when the maximum evaluation value is small, this means that the photographing environment changes little. It is therefore necessary to set the threshold value to be small in order to reliably recognize the timing for the automatic image capture.

The present invention therefore sets the threshold value (permitted range) for detecting movement of the subject to within the auto shutter area while taking into consideration change (variation) of the photographing environment in this manner. The detection of movement of the subject to within the auto shutter area, i.e. the precision of trigger detection for automatic image capture is not substantially influenced by the photographing environment.

The control unit 22 then determines whether or not acquisition of a frame image is complete (image capture complete) (step S32). When it is determined that a frame image is acquired (step S32, YES), the control unit 22 acquires difference values between pixels included in the auto shutter area using the same processing as for step S23 of FIG. 5 (step S33). The control unit 22 then calculates a difference between a difference value for a frame image acquired in step S33 and the reference difference value stored in the DRAM 21. This difference is then stored temporarily in the DRAM 21 as the evaluation value (step S34).

The control unit 22 then determines whether or not the evaluation value acquired in step S34 is larger than the threshold value (permitted range) set in step S31 (step S35). As a result, when the evaluation value is not larger than the threshold value (permitted range) (step S35, NO), the control unit 22 repeats the processing from step S32 onwards. On the other hand, when the evaluation value is larger than the threshold value (permitted range) (step S35, YES), the control unit 22 executes auto shutter processing (step S36). Specifically, the control unit 22 immediately blocks the path from the CCD 13 to the DRAM 21 after the completion of DMA transfer of luminance and chrominance signals for one screen portion captured from the CCD 13 at this time to the DRAM 21 and a transition is made to a recording/saving state.

In this recording/saving state, the control unit 22 outputs the luminance and chrominance signals for one frame portion written into the DRAM 21 to the JPEG circuit 27 via the DRAM I/F 20. The control unit 22 then records compressed data (encoded data) acquired from the JPEG circuit 27 to the storage memory 28 as a data file for one image. The path from the CCD 13 to the DRAM 21 is then re-activated in accordance with processing for compressing the luminance and chrominance signals for one frame portion and the completion of writing of the compressed data to the storage memory 28.

Control relating to the auto shutter mode is then complete.

Figure 8A:
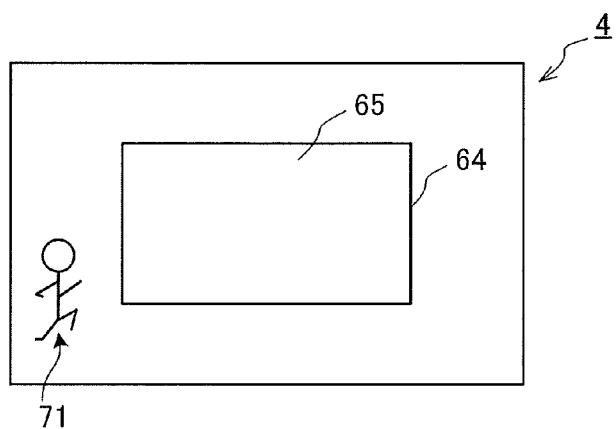
FIGS. 8A to 8D are views showing the state of the liquid crystal monitor screen up until an auto shutter operation is executed in the auto shutter processing.
Figure 8B:
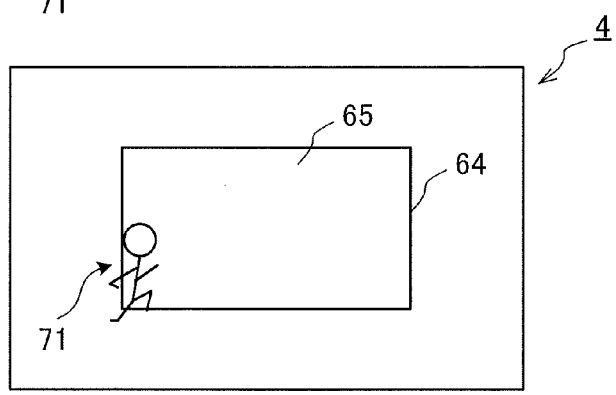
Figure 8C:
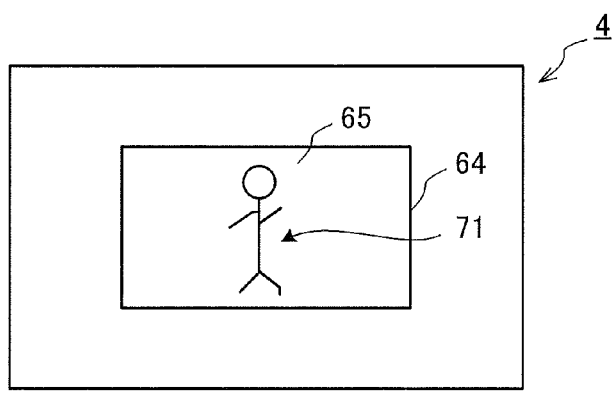
Figure 8D:
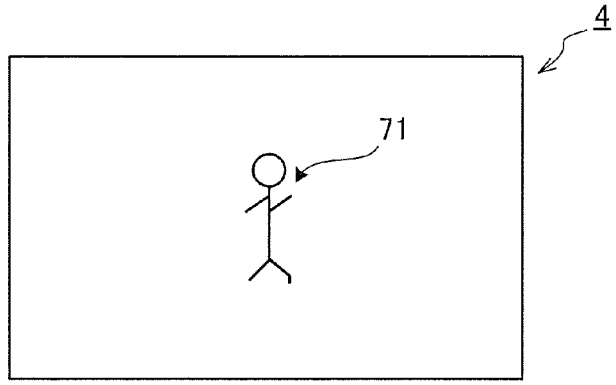

FIGS. 8A to 8D are diagrams showing the state of the liquid crystal monitor screen 4 until the auto shutter is executed in the auto shutter processing. FIG. 8A shows the situation where a moving subject 71 is displayed in the through image but is not within the auto shutter area frame 64. FIG. 8B shows the situation where the subject 71 is near to the auto shutter area frame 64, or the user (photographer) attempts to move the digital camera 1 so as to bring the subject 71 to within the auto shutter area frame 64. FIG. 8C shows a situation where the subject 71 is completely within the auto shutter area 65. When the situation becomes as shown in FIG. 8C, the auto shutter is executed and a still image as shown in FIG. 8D is acquired.

In this embodiment, a frame image read in from the CCD 13 at the time where the evaluation value is determined to be larger than the threshold value (permitted range) is taken to be a target image to be recorded in the storage memory 28. However, which timing upon which the image is captured to be taken as a recording target is arbitrary.

For example, it is possible for an immediately preceding frame image that was already acquired to be taken to be the recording target image of the timing where it is determined that the evaluation value exceeds the threshold value. Alternatively, it is also possible for a frame image acquired directly after the timing where it is determined that the evaluation value exceeds the threshold value to be taken as the recording target image.

In this embodiment, just a single frame image is recorded in the storage memory 28 while executing the auto shutter but it is also possible for a plurality of frame images to be recorded.

For example, it is possible for a plurality of frame images consecutively acquired from the timing where the evaluation value is determined to exceed the threshold value onwards to be recorded in the storage memory 28. It is also possible for a plurality of frame images consecutively acquired immediately before the timing where the evaluation value is determined to exceed the threshold value to be recorded in the storage memory 28. Alternatively, it is possible for a plurality of frame images acquired at timings before and after the timing where the evaluation value is determined to exceed the threshold value to be recorded in the storage memory 28.

The following method can be considered as a method for recording frame images for before the timing where the evaluation value is determined to exceed the threshold value to the storage memory 28.

For example, after the AF processing, when it is determined that the shutter key 8 is pressed down completely, additional storage of consecutively acquired frame images to the DRAM 21 commences. After additional storage of a prescribed number (for example, 10) of frame images to the DRAM 21 is complete, the oldest frame image of the plurality of frame images stored in the DRAM 21 is deleted every time a frame image is acquired and the newly acquired frame image is stored. This operation is then repeated until the evaluation value exceeds the threshold value. The plurality of frame images stored in the DRAM 21 at the time when the evaluation value exceeds the threshold value are then recorded in the storage memory 28.

In this embodiment, the frame images captured from the CCD 13 at the time where it is determined that the threshold value has been exceeded by the evaluation value are taken to be the target images to be recorded in the storage memory 28. However, it is also possible to record still images acquired by still image photographing processing at this time to the storage memory 28. In this case, it is possible to execute still image capturing processing by changing over a driving method for the CCD 13 or a processing method for the color process circuit 18 by switching over from a through image capturing mode to a still image capturing mode at the time where the evaluation value is determined to exceed the threshold value.

In this embodiment, the position and size of the auto shutter area can be arbitrarily set by the user. However it is also possible for just one of the position and size of the auto shutter area to be set by the user. Alternatively, it is also possible for the user not to arbitrarily set anything, i.e. to use an auto shutter area of a position fixed in advance (for example, at the center of the angular field of view) and of a fixed size. It is also possible to set the position and size of the auto shutter area to automatically track the position and size of the subject moving within the angle of view (screen) by utilizing a subject tracking (following) function.

In this embodiment, an auto shutter area is used but it is also possible to observe the state of change in the whole of a frame image without providing an auto shutter area.

In this embodiment, auto shutter (automatic image capture) is executed when it is determined that the evaluation value is larger than the threshold value (limited range). Conversely, it is also possible to set a lower limit threshold value, and execute auto shutter when the evaluation value is determined to be smaller than (fall below) the threshold value.

In this embodiment, the amount of change of the frame image acquired consecutively is monitored and automatic image capture is carried out when the extent of this change exceeds a threshold value. However, it is also possible to observe the position of a subject moving within the angle of view (screen) by utilizing a subject tracking (following) function and then automatically carrying out image capture when the subject moves to a prescribed position.

For example, a method can be considered where an area of a certain size is set in advance at a certain position within the screen. Automatic image capture is then carried out when a subject within the set area goes outside of the set area or when a subject that is outside of the set area enters the set area.

It is also possible for an image capturing device such as an existing digital camera to function as an image capturing device of the present invention by applying this program. In other words, the configuration and processing for each function described above are executed by applying the program executed by the control unit 22 to an existing image capturing device so as to be executed by a computer (CPU etc.) that controls the image capturing device.

The method for distributing this program is arbitrary and distribution through storage in a recording medium such as, for example, a CD-ROM (Compact Disc Read-Only Memory), a DVD (Digital Versatile Disc), an MO (Magneto-Optical disc), or a memory card etc. is possible. Distribution via a communication network such as, for example, the Internet is also possible. It is then possible to implement the same functions as for the digital camera 1 described above by installing the program distributed in the above manner on an image capturing device such as a digital camera.

An explanation is given in this embodiment of the case of applying the image capturing device of the present invention to a digital camera. However, in addition to digital cameras, the present invention is also applicable to mobile telephones with cameras or various information equipment including image capturing units.

Various embodiments and changes may be made thereunto without departing from the broad spirit and scope of the invention. The above-described embodiment embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application claims priority based on Japanese Patent Application No. 2007-338556 filed on Dec. 28, 2007, the entire disclosure of which is incorporated herein by reference in its entirety.

What is claimed is:

1. An image capturing device comprising:
   an image capturing unit that captures an image of a subject and outputs the captured image;
   a monitoring unit that monitors a state of the captured images consecutively outputted by the image capturing unit;
   a first determining unit that determines whether or not the state of the captured image monitored by the monitoring unit satisfies an image recording condition;
   a recording control unit that performs automatic control such that (i) the captured image is recorded to a recording unit when the first determining unit determines that the image recording condition is satisfied, and (ii) the captured image is not recorded to the recording unit when the first determining unit determines that the image recording condition is not satisfied;
   a second determining unit that determines whether or not a state of the captured image monitored by the monitoring unit is a state in which a determination can be carried out appropriately by the first determining unit; and
   a warning unit that provides a warning indication when it is determined by the second determining unit that a state exists in which the determination by the first determining unit cannot be carried out appropriately;
   wherein the monitoring unit comprises a determination data calculating unit that calculates determination data from the captured images outputted by the image capturing unit to be used to perform the determination by the first determining unit and a determination by the second determining unit, and
   wherein the determination data calculating unit calculates the determination data used by the first determining unit and the determination data used by the second determining unit in the same manner.

2. The image capturing device according to claim 1, further comprising a partial region specifying unit that specifies a partial region occurring within the captured image outputted by the image capturing unit,
   wherein the monitoring unit monitors the state of an image portion corresponding to the partial region specified by the partial region specifying unit, and
   wherein the first determining unit determines whether or not the state of the image portion monitored by the monitoring unit satisfies the image recording condition.

3. The image capturing device according to claim 2, wherein the partial region specifying unit specifies the partial region at an arbitrary position within the captured image outputted by the image capturing unit.

4. The image capturing device according to claim 2, wherein the partial region specifying unit specifies the partial region to have an arbitrary size within the captured image outputted by the image capturing unit.

5. The image capturing device according to claim 1, further comprising an inhibiting unit that inhibits process execution at the monitoring unit or the recording control unit when it is determined by the second determining unit that a state exists in which the determination by the first determining unit cannot be carried out appropriately.

6. The image capturing device according to claim 1, wherein the monitoring unit monitors an amount of change of the captured images consecutively outputted by the image capturing unit,
   wherein the first determining unit determines whether or not the amount of change of the captured image monitored by the monitoring unit exceeds a predetermined threshold value, and
   wherein the recording control unit records the captured image to the recording unit when the first determining unit determines that the amount of change of the captured image exceeds the threshold value.

7. The image capturing device according to claim 6, wherein the second determining unit determines whether or not the amount of change of captured images monitored by the monitoring unit exceeds a prescribed amount, and
   wherein the warning unit issues a warning when the second determining unit determines that the amount of change for the captured images exceeds the prescribed amount.

8. The image capturing device according to claim 6, further comprising a threshold value setting unit that sets a threshold value according to the amount of change of the captured images monitored by the monitoring unit,
   wherein the first determining unit determines whether or not the amount of change for the captured image monitored by the monitoring unit exceeds the threshold value set by the threshold value setting unit.

9. The image capturing device according to claim 6, wherein the monitoring unit further comprises:
   a pixel difference value acquiring unit that consecutively acquires, for each frame, a pixel difference value between a plurality of pixels constituting the captured image, which corresponds to a frame, outputted by the image capturing unit;

wherein the determination data calculating unit calculates, as the determination data, a difference between frames in the pixel difference values consecutively acquired by the pixel difference value acquiring unit, and the calculated difference is successively acquired as an evaluation value in order to observe the amount of change of the captured images outputted consecutively by the image capturing unit.

10. A non-transitory computer-readable recording medium storing a program which controls a computer of an image capturing device, which comprises an image capturing unit that captures an image of a subject and outputs the captured image, to execute processes comprising:

a monitoring process of monitoring a state of the captured images consecutively outputted by the image capturing unit;

a first determining process of determining whether or not the state of the captured image monitored in the monitoring process satisfies an image recording condition;

a recording control process of performing automatic control such that (i) the captured image is recorded to a recording unit when it is determined in the first determining process that the image recording condition is satisfied, and (ii) the captured image is not recorded to the recording unit when it is determined in the first determining process that the image recording condition is not satisfied;

a second determining process of determining whether or not a state of the captured image monitored in the monitoring process is a state in which a determination can be carried out appropriately in the first determining process; and a warning process of providing a warning indication when it is determined in the second determining process that a state exists in which determination in the first determining process cannot be carried out appropriately;

wherein the monitoring process comprises a determination data calculating process of calculating determination data from the captured images outputted by the image capturing unit to be used to perform the determination of the first determining process and a determination of the second determining process, and wherein in the determination data calculating process, the determination data used in the first determining process and the determination data used in the second determining process are calculated in the same manner.

* * * * *